(12) United States Patent
Imamura

(10) Patent No.: US 9,121,993 B2
(45) Date of Patent: Sep. 1, 2015

(54) MULTI-CORE OPTICAL FIBER AND METHOD OF OPTICAL TRANSMISSION

(71) Applicant: FURUKAWA ELECTRIC CO., LTD., Tokyo (JP)

(72) Inventor: Katsunori Imamura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 137 days.

(21) Appl. No.: 13/939,903

(22) Filed: Jul. 11, 2013

(65) Prior Publication Data

US 2013/0302002 A1     Nov. 14, 2013

Related U.S. Application Data

(63) Continuation of application No. PCT/JP2012/050592, filed on Jan. 13, 2012.

(30) Foreign Application Priority Data

Sep. 7, 2011    (JP) .................................. 2011-195160

(51) Int. Cl.
    *G02B 6/036*        (2006.01)
    *H04J 14/04*        (2006.01)
    *G02B 6/02*         (2006.01)
    *G02B 6/28*         (2006.01)

(52) U.S. Cl.
    CPC ............. *G02B 6/02042* (2013.01); *H04J 14/04* (2013.01); *G02B 6/2835* (2013.01)

(58) Field of Classification Search
None
See application file for complete search history.

(56) References Cited

U.S. PATENT DOCUMENTS

| 8,285,094 | B2 * | 10/2012 | Takenaga et al. | 385/100 |
|---|---|---|---|---|
| 9,031,368 | B2 * | 5/2015 | Hayashi | 385/100 |
| 2013/0039627 | A1 * | 2/2013 | Li et al. | 385/126 |
| 2013/0251320 | A1 * | 9/2013 | Hayashi | 385/100 |
| 2013/0301998 | A1 * | 11/2013 | Hayashi | 385/100 |

FOREIGN PATENT DOCUMENTS

WO     2011/024808     3/2011

OTHER PUBLICATIONS

Office Action issued Jul. 10, 2012 in Japanese Patent Application No. 2012-524017 (with English language translation).
Masanori Koshiba, "Kinds of Multi-Core Fibers and the Design Guidance" JSAP, Kougaku, vol. 40, No. 6, Jun. 10, 2011, pp. 264-268 (with partial English language translation).
International Search Report issued on Feb. 7, 2012 for PCT/JP2012/050592 filed on Jan. 13, 2012 with English Translation.
(Continued)

*Primary Examiner* — Michelle R Connelly
*Assistant Examiner* — John M Bedtelyon
(74) *Attorney, Agent, or Firm* — Oblon, McClelland, Maier & Neustadt, L.L.P.

(57) ABSTRACT

A multi-core optical fiber has: a plurality of core portions; a cladding portion that is positioned around each of the plurality of core portions and has a refractive index lower than that of each of the plurality of core portions; and a separation distance between adjacent ones of the plurality of core portions being set so that crosstalk of light between the adjacent core portions over an entire length thereof becomes −15 dB or greater at a wavelength of 1550 nm and a cable cut-off wavelength becomes 1530 nm or less.

4 Claims, 10 Drawing Sheets

(56) References Cited

OTHER PUBLICATIONS

International Written Opinion issued on Feb. 7, 2012 for PCT/JP2012/050592 filed on Jan. 13, 2012.

Y. Kokubun et al.; "Proposal of Heterogeneous Uncoupled and Homogeneous Coupled Multicore Fibers for Space/Mode-Division Multiplexing"; IEICE Technical Report; Jul. 23, 2009; vol. 109, No. 158, pp. 165-170.

M. Salsi et al.; "Transmission at 2×100Gb/s, over Two Modes of 40 km-long Prototype Few-Mode Fiber, using LCOS-based Mode Multiplexer and Demultiplexer"; OFC2011, PDPB9.

R. Ryf et al.; "Space-division multiplexing over 10 km of three-mode fiber using coherent 6×6 MIMO processing"; OFC2011, PDPB10.

B. Zhu et al.; "Space-, Wavelength-Polarization-Division Multiplexed Transmission of 56-Tb/s over a 76.8-km Seven-Core Fiber"; OFC2011, PDPB7.

B. Zhu et al.; "112-Tb/s Space-division multiplexed DWDM transmission with 14-b/s/Hz aggregate spectral efficiency over a 76.8-km seven-core fiber"; Aug. 15, 2011; vol. 19, No. 17/Optics Express pp. 16665-16671.

I. Michialle et al.; "Phase locking and supermode selection in multicore photonic crystal fiber lasers with a large doped area"; Jan. 21, 2005; Optics Letters vol. 30, No. 13, pp. 1668-1670.

M. Koshiba et al.; "Heterogeneous multi-core fibers: proposal and design principle"; IEICE Electronics Express; vol. 6, No. 2, 98-103.

Y. Kokubun et al.; "Novel multi-core fibers for mode division multiplexing: proposal and design principle"; IEICE Electronics Express, vol. 6, No. 8, pp. 522-528.

* cited by examiner

FIG.5

CROSSTALK (dB)

| No. | CORE DIAMETER ($\mu m$) | Δ (%) | neff | Aeff ($\mu m^2$) | $\lambda cc$ (nm) | LENGTH: 100 m DISTANCE BETWEEN CORES | | | LENGTH: 1 km DISTANCE BETWEEN CORES | | | LENGTH: 10 km DISTANCE BETWEEN CORES | | | LENGTH: 100 km DISTANCE BETWEEN CORES | | |
|---|---|---|---|---|---|---|---|---|---|---|---|---|---|---|---|---|---|
| | | | | | | 25 $\mu m$ | 30 $\mu m$ | 35 $\mu m$ | 25 $\mu m$ | 30 $\mu m$ | 35 $\mu m$ | 25 $\mu m$ | 30 $\mu m$ | 35 $\mu m$ | 25 $\mu m$ | 30 $\mu m$ | 35 $\mu m$ |
| 1 | 5 | 0.45 | 1.4456 | 67.9 | 810 | 0 | 0 | -5.5 | 0 | 0 | 0 | 0 | 0 | 0 | 0 | 0 | 0 |
| 2 | 5 | 0.6 | 1.4467 | 45.6 | 946 | 0 | -12.9 | -28.7 | 0 | -2.9 | -18.7 | 0 | 0 | -8.7 | 0 | 0 | 0 |
| 3 | 6 | 0.35 | 1.4455 | 82.2 | 860 | 0 | 0 | -2.8 | 0 | 0 | 0 | 0 | 0 | 0 | 0 | 0 | 0 |
| 4 | 6 | 0.45 | 1.4463 | 60.0 | 985 | 0 | -5.7 | -20.1 | 0 | 0 | -10.1 | 0 | 0 | -0.1 | 0 | 0 | 0 |
| 5 | 6 | 0.6 | 1.4477 | 45.5 | 1151 | -6.4 | -25.2 | -43.9 | 0 | -15.2 | -33.9 | 0 | -5.2 | -23.9 | 0 | 0 | -13.9 |
| 6 | 7 | 0.35 | 1.4460 | 76.8 | 1016 | 0 | 0 | -12.4 | 0 | 0 | -2.4 | 0 | 0 | 0 | 0 | 0 | 0 |
| 7 | 7 | 0.4 | 1.4464 | 67.4 | 1092 | 0 | -6.5 | -21.4 | 0 | 0 | -11.4 | 0 | 0 | -1.4 | 0 | 0 | 0 |
| 8 | 7 | 0.45 | 1.4469 | 60.9 | 1163 | 0 | -13.5 | -29.9 | 0 | -3.5 | -19.9 | 0 | 0 | -9.9 | 0 | 0 | 0 |
| 9 | 7 | 0.6 | 1.4486 | 49.5 | 1360 | -11.8 | -32.8 | -53.5 | -1.8 | -22.8 | -43.5 | 0 | -12.8 | -33.5 | 0 | -2.8 | -23.5 |
| 10 | 8 | 0.25 | 1.4454 | 108.0 | 978 | 0 | 0 | -0.5 | 0 | 0 | 0 | 0 | 0 | 0 | 0 | 0 | 0 |
| 11 | 8 | 0.35 | 1.4464 | 78.5 | 1173 | 0 | -5.0 | -19.7 | 0 | 0 | -9.7 | 0 | 0 | 0 | 0 | 0 | 0 |
| 12 | 8 | 0.4 | 1.4469 | 70.9 | 1261 | 0 | -12.2 | -28.6 | 0 | -2.2 | -18.6 | 0 | 0 | -8.6 | 0 | 0 | 0 |
| 13 | 8 | 0.45 | 1.4475 | 65.4 | 1345 | -0.8 | -19.0 | -37.0 | 0 | -9.0 | -27.0 | 0 | 0 | -17.0 | 0 | 0 | -7.0 |
| 14 | 9 | 0.25 | 1.4457 | 108.1 | 1111 | 0 | 0 | -5.2 | 0 | 0 | 0 | 0 | 0 | 0 | 0 | 0 | 0 |
| 15 | 9 | 0.35 | 1.4468 | 83.6 | 1333 | 0 | -8.3 | -24.3 | 0 | 0 | -14.3 | 0 | 0 | -4.3 | 0 | 0 | 0 |
| 16 | 9 | 0.4 | 1.4474 | 77.0 | 1434 | 0 | -15.3 | -33.0 | 0 | -5.3 | -23.0 | 0 | 0 | -13.0 | 0 | 0 | -3.0 |
| 17 | 9 | 0.45 | 1.4480 | 72.0 | 1529 | -2.5 | -21.9 | -41.1 | 0 | -11.9 | -31.1 | 0 | -1.9 | -21.1 | 0 | 0 | -11.1 |
| 18 | 10 | 0.25 | 1.4460 | 112.6 | 1245 | 0.0 | 0 | -9.1 | 0 | 0 | 0 | 0 | 0 | 0 | 0 | 0 | 0 |
| 19 | 10 | 0.35 | 1.4471 | 90.9 | 1495 | 0.0 | -10.7 | -27.7 | 0 | -0.7 | -17.7 | 0 | 0 | -7.7 | 0 | 0 | 0 |
| 20 | 11 | 0.2 | 1.4456 | 139.6 | 1223 | 0 | 0 | -1.3 | 0 | 0 | 0 | 0 | 0 | 0 | 0 | 0 | 0 |
| 21 | 12 | 0.2 | 1.4458 | 147.1 | 1344 | 0 | 0 | -3.2 | 0 | 0 | 0 | 0 | 0 | 0 | 0 | 0 | 0 |
| 22 | 13 | 0.2 | 1.4459 | 156.6 | 1466 | 0 | 0 | -4.3 | 0 | 0 | 0 | 0 | 0 | 0 | 0 | 0 | 0 |

FIG.6

DISTANCE BETWEEN CORES (μm)

| No. | CORE DIAM-ETER (μm) | Δ (%) | LENGTH: 100 m | | LENGTH: 1 km | | LENGTH: 10 km | | LENGTH: 100 km | |
|---|---|---|---|---|---|---|---|---|---|---|
| | | | CROSSTALK | | CROSSTALK | | CROSSTALK | | CROSSTALK | |
| | | | 0 dB | -15 dB | 0 dB | -15 dB | 0 dB | -15 dB | 0 dB | -15 dB |
| 1 | 5 | 0.45 | 32.7 | 39.1 | 37.0 | 43.4 | 41.2 | 47.6 | 45.5 | 51.9 |
| 2 | 5 | 0.6 | 26.0 | 30.7 | 29.2 | 33.9 | 32.3 | 37.0 | 35.4 | 40.2 |
| 3 | 6 | 0.35 | 33.8 | 40.4 | 38.2 | 44.9 | 42.7 | 49.3 | 47.1 | 53.7 |
| 4 | 6 | 0.45 | 28.1 | 33.3 | 31.6 | 36.7 | 35.0 | 40.2 | 38.5 | 43.6 |
| 5 | 6 | 0.6 | 23.3 | 27.3 | 26.0 | 30.0 | 28.7 | 32.7 | 31.3 | 35.3 |
| 6 | 7 | 0.35 | 30.4 | 36.0 | 34.1 | 39.8 | 37.9 | 43.5 | 41.6 | 47.3 |
| 7 | 7 | 0.4 | 27.9 | 32.9 | 31.2 | 36.2 | 34.6 | 39.6 | 37.9 | 42.9 |
| 8 | 7 | 0.45 | 26.0 | 30.5 | 29.0 | 33.5 | 32.0 | 36.6 | 35.1 | 39.6 |
| 9 | 7 | 0.6 | 22.2 | 25.8 | 24.6 | 28.2 | 27.0 | 30.6 | 29.4 | 33.0 |
| 10 | 8 | 0.25 | 34.8 | 41.6 | 39.3 | 46.1 | 43.8 | 50.6 | 48.3 | 55.1 |
| 11 | 8 | 0.35 | 28.4 | 33.4 | 31.8 | 36.8 | 35.1 | 40.2 | 38.5 | 43.5 |
| 12 | 8 | 0.4 | 26.4 | 30.9 | 29.4 | 33.9 | 32.4 | 37.0 | 35.4 | 40.0 |
| 13 | 8 | 0.45 | 24.8 | 29.0 | 27.6 | 31.7 | 30.3 | 34.5 | 33.1 | 37.2 |
| 14 | 9 | 0.25 | 32.9 | 39.0 | 37.0 | 43.0 | 41.0 | 47.1 | 45.1 | 51.2 |
| 15 | 9 | 0.35 | 27.5 | 32.1 | 30.6 | 35.2 | 33.7 | 38.4 | 36.8 | 41.5 |
| 16 | 9 | 0.4 | 25.8 | 30.0 | 28.6 | 32.8 | 31.4 | 35.6 | 34.2 | 38.4 |
| 17 | 9 | 0.45 | 24.4 | 28.3 | 27.0 | 30.9 | 29.6 | 33.4 | 32.2 | 36.0 |
| 18 | 10 | 0.25 | 31.6 | 37.3 | 35.4 | 41.0 | 39.1 | 44.8 | 42.9 | 48.5 |
| 19 | 10 | 0.35 | 26.9 | 31.3 | 29.9 | 34.2 | 32.8 | 37.2 | 35.7 | 40.1 |
| 20 | 11 | 0.2 | 34.5 | 40.8 | 38.7 | 45.0 | 42.9 | 49.2 | 47.1 | 53.4 |
| 21 | 12 | 0.2 | 33.7 | 39.7 | 37.7 | 43.7 | 41.7 | 47.7 | 45.7 | 51.6 |
| 22 | 13 | 0.2 | 33.4 | 39.1 | 37.2 | 42.9 | 41.0 | 46.7 | 44.8 | 50.5 |

FIG.7

| CORE DIAM-ETER (μm) | LENGTH: 100 m RELATIVE REFRACTIVE-INDEX DIFFERENCE Δ (%) DISTANCE BETWEEN CORES | | | | | | LENGTH: 1 km DISTANCE BETWEEN CORES | | | | | |
|---|---|---|---|---|---|---|---|---|---|---|---|---|
| | 25 μm CROSSTALK | | 30 μm CROSSTALK | | 35 μm CROSSTALK | | 25 μm CROSSTALK | | 30 μm CROSSTALK | | 35 μm CROSSTALK | |
| | 0 dB | -15 dB | 0 dB | -15 dB | 0 dB | -15 dB | 0 dB | -15 dB | 0 dB | -15 dB | 0 dB | -15 dB |
| 5 | 0.63 | 0.75 | 0.50 | 0.62 | 0.41 | 0.51 | 0.72 | 0.82 | 0.58 | 0.69 | 0.48 | 0.58 |
| 6 | 0.54 | 0.68 | 0.41 | 0.52 | 0.34 | 0.42 | 0.64 | 0.77 | 0.48 | 0.60 | 0.39 | 0.48 |
| 7 | 0.48 | 0.64 | 0.36 | 0.46 | 0.30 | 0.37 | 0.59 | 0.75 | 0.42 | 0.54 | 0.34 | 0.42 |
| 8 | 0.44 | 0.60 | 0.33 | 0.42 | 0.25 | 0.33 | 0.55 | 0.72 | 0.39 | 0.50 | 0.31 | 0.38 |
| 9 | 0.43 | 0.60 | 0.29 | 0.40 | 0.23 | 0.30 | 0.54 | 0.71 | 0.36 | 0.48 | 0.27 | 0.35 |
| 10 | 0.41 | 0.59 | 0.28 | 0.38 | 0.21 | 0.28 | 0.53 | 0.71 | 0.34 | 0.46 | 0.26 | 0.33 |
| 11 | 0.42 | 0.59 | 0.27 | 0.38 | 0.19 | 0.27 | 0.53 | 0.70 | 0.34 | 0.46 | 0.25 | 0.32 |
| 12 | 0.42 | 0.61 | 0.27 | 0.37 | 0.17 | 0.26 | 0.55 | 0.73 | 0.33 | 0.46 | 0.24 | 0.32 |
| 13 | 0.42 | 0.64 | 0.26 | 0.38 | 0.16 | 0.26 | 0.57 | 0.77 | 0.34 | 0.47 | 0.24 | 0.32 |

FIG.8

| CORE DIAMETER (μm) | LENGTH: 10 km RELATIVE REFRACTIVE-INDEX DIFFERENCE Δ (%) | | | | | | LENGTH: 100 km | | | | | |
|---|---|---|---|---|---|---|---|---|---|---|---|---|
| | DISTANCE BETWEEN CORES | | | | | | DISTANCE BETWEEN CORES | | | | | |
| | 25 μm | | 30 μm | | 35 μm | | 25 μm | | 30 μm | | 35 μm | |
| | CROSSTALK | | CROSSTALK | | CROSSTALK | | CROSSTALK | | CROSSTALK | | CROSSTALK | |
| | 0 dB | -15 dB | 0 dB | -15 dB | 0 dB | -15 dB | 0 dB | -15 dB | 0 dB | -15 dB | 0 dB | -15 dB |
| 5 | 0.79 | 0.88 | 0.65 | 0.75 | 0.55 | 0.64 | 0.85 | 0.93 | 0.72 | 0.80 | 0.61 | 0.69 |
| 6 | 0.72 | 0.84 | 0.56 | 0.67 | 0.45 | 0.55 | 0.81 | 0.91 | 0.64 | 0.74 | 0.51 | 0.61 |
| 7 | 0.69 | 0.85 | 0.50 | 0.63 | 0.39 | 0.48 | 0.80 | 0.94 | 0.58 | 0.71 | 0.45 | 0.55 |
| 8 | 0.66 | 0.83 | 0.46 | 0.58 | 0.35 | 0.44 | 0.77 | 0.93 | 0.54 | 0.67 | 0.41 | 0.50 |
| 9 | 0.65 | 0.82 | 0.44 | 0.57 | 0.32 | 0.41 | 0.76 | 0.91 | 0.52 | 0.66 | 0.38 | 0.48 |
| 10 | 0.65 | 0.83 | 0.42 | 0.56 | 0.30 | 0.39 | 0.77 | 0.94 | 0.51 | 0.65 | 0.36 | 0.46 |
| 11 | 0.65 | 0.81 | 0.42 | 0.54 | 0.30 | 0.38 | 0.76 | 0.91 | 0.50 | 0.63 | 0.35 | 0.45 |
| 12 | 0.67 | 0.84 | 0.42 | 0.55 | 0.29 | 0.38 | 0.79 | 0.95 | 0.51 | 0.64 | 0.35 | 0.45 |
| 13 | 0.71 | 0.89 | 0.42 | 0.57 | 0.29 | 0.38 | 0.83 | 1.01 | 0.52 | 0.67 | 0.35 | 0.45 |

FIG.11

|  | DISTANCE BETWEEN CORES | CLADDING OUTER DIAMETER | COATING OUTER DIAMETER |
|---|---|---|---|
|  | μm | μm | μm |
| REFERENCE EXAMPLE | 20 | 132 | 281 |
| EXAMPLE 1 | 25 | 163 | 282 |
| EXAMPLE 2 | 30 | 164 | 325 |
| EXAMPLE 3 | 35 | 188 | 316 |

FIG.12

|  | TRANS-MISSION LOSS | MFD | CABLE CUT-OFF WAVE-LENGTH | BENDING LOSS (BENDING DIAMETER 20 mm) | Aeff | INCIDENCE-END CROSS-TALK |
|---|---|---|---|---|---|---|
|  | dB/km | μm | nm | dB/m | μm$^2$ | dB |
| REFERENCE EXAMPLE | 0.69 | - | - | 18.8 | - | -4.3 |
| EXAMPLE 1 | 0.45 | 10.0 | 1408 | 7.0 | 74 | -4.3 |
| EXAMPLE 2 | 0.49 | 10.7 | 1270 | 6.6 | 84 | -4.9 |
| EXAMPLE 3 | 0.45 | 11.1 | 1421 | 1.1 | 91 | -13.5 |

MULTI-CORE OPTICAL FIBER AND METHOD OF OPTICAL TRANSMISSION

CROSS-REFERENCE TO RELATED APPLICATIONS

This application is a continuation of PCT International Application No. PCT/JP2012/050592 filed on Jan. 13, 2012, which claims the benefit of priority from a prior Japanese Patent Application No. 2011-195160 filed on Sep. 7, 2011. The entire contents of the PCT international application and the Japanese patent application are incorporated herein by reference.

BACKGROUND OF THE INVENTION

1. Field of the Disclosure

The disclosure relates to a multi-core optical fiber and a method of optical transmission.

2. Description of the Related Art

As one of techniques allowing large capacity transmission, mode division multiplexing (MDM) transmission has attracted attention (see Non Patent Literature 1: M. Salsi et al., "Transmission at 2×100 Gb/s, over Two Modes of 40 km-long Prototype Few-Mode Fiber, using LCOS based Mode Multiplexer and Demultiplexer," OFC2011, PDPB9; for example). This mode division multiplexing transmission is a technique of propagating a plurality of signal light beams respectively in a plurality of different propagation modes of an optical fiber. By this mode division multiplexing transmission, a transmission capacity per one optical fiber can be increased largely. In conventional mode division multiplexing transmission, as an optical fiber to be a transmission medium, a multi-mode optical fiber having a plurality of higher-order propagation modes is presumed to be used. Particularly, few-mode fibers for which each transmission mode is easily controllable have attracted attention. There is a possibility that interference among signal light beams respectively propagating in their modes during their propagation causes distortion of signal light and thus deterioration in signal quality. By using a multiple-input multiple-output (MIMO) technique utilized in the wireless field, studies for ensuring signal quality have been performed (see Non Patent Literature 1 and Non Patent Literature 2: R. Ryf et al., "Space-division multiplexing over 10 km of three-mode fiber using coherent 6×6 MIMO processing," OFC2011, PDPB10; for example). This MIMO technique utilized in the wireless field is a technique of transmitting different independent signals on the same channel from a plurality of transmission antennas at a transmitting station end, receiving the signals by using a plurality of antennas similarly at a receiving station end, obtaining a transfer function matrix between each transmission antenna and the receiving antennas, estimating the independent signal transmitted from each antenna at the transmitting station end by using the transfer function matrix, and reproducing data. In optical fiber transmission also, by obtaining a transfer function matrix of an optical fiber to be a transmission medium using training signals, independent signal light beams transmitted from a transmitting station end is able to be estimated.

As means for also realizing large capacity transmission, multi-core optical fibers each having a plurality of core portions in one optical fiber have attracted attention. It is expected that by propagating a different signal light beam in each core portion of the multi-core optical fiber, large capacity by space division multiplexing (SDM) transmission is achievable. Recently, experimental results of space division multiplexing transmission using multi-core optical fibers have started to be reported (see Non Patent Literature 3: B. Zhu et al., "Space-, Wavelength-, Polarization-Division Multiplexed Transmission of 56-Tb/s over a 76.8-km Seven-Core Fiber," OFC2011, PDPB7 and Non Patent Literature 4: B. Zhu et al., "112-Tb/s Space-division multiplexed DWDM transmission with 14-b/s/Hz aggregate spectral efficiency over a 76.8-km seven-core fiber," 15 Aug. 2011/Vol. 19, No. 17/OPTICS EXPRESS pp. 16665-16671, for example).

To realize mode division multiplexing transmission, a plurality of signal light beams need to be simultaneously input to an optical fiber, which is a transmission medium, and coupled to respective propagation modes. In a higher-order propagation mode, a field distribution of light is asymmetrical with respect to a propagation axis of the optical fiber and hence, in order to be effectively coupled to each propagation mode, each signal light beam must be input with its input position at a facet of the optical fiber being adjusted. As such input means, a spatial coupling system or the like using a liquid-crystal-on-silicon (LCOS) element (Non Patent Literature 1) or a beam splitter element (Non Patent Literature 2) has been proposed.

However, both of these elements require complex structures and precise adjustments. Further, in spatial coupling systems, improving coupling efficiency or reduction in optical loss is difficult.

Accordingly, there is a need to provide a multi-core optical fiber for mode division multiplexing transmission and a method of optical transmission that do not require complex structures or precise adjustments when a plurality of signal light beams are input simultaneously and that are able to reduce optical loss.

SUMMARY OF THE INVENTION

According to an embodiment of the present invention, a multi-core optical fiber has: a plurality of core portions; a cladding portion that is positioned around each of the plurality of core portions and has a refractive index lower than that of each of the plurality of core portions; and a separation distance between adjacent ones of the plurality of core portions being set so that crosstalk of light between the adjacent core portions over an entire length thereof becomes −15 dB or greater at a wavelength of 1550 nm and a cable cut-off wavelength becomes 1530 nm or less.

According to another embodiment of the present invention, a method of optical transmission includes: using a supermode of the multi-core optical fiber; and performing mode division multiplexing transmission.

The above and other objects, features, advantages and technical and industrial significance of this invention will be better understood by reading the following detailed description of presently preferred embodiment of the invention, when considered in connection with the accompanying drawings.

BRIEF DESCRIPTION OF THE DRAWINGS

FIG. 5 is a table listing results of simulation for a relation among core diameter, relative refractive-index difference Δ, and the crosstalk;

FIG. 6 is a table listing results of simulation for distance between cores at which crosstalk becomes 0 dB or −15 dB;

FIG. 7 is a table listing results of simulation for a relation between core diameter and relative refractive-index difference Δ at which crosstalk becomes 0 dB or −15 dB;

FIG. 8 is a table listing results of simulation for a relation between core diameter and relative refractive-index difference Δ at which crosstalk becomes 0 dB or −15 dB;

FIG. 11 is a table listing distances between cores, cladding outer diameters, and coating outer diameters of multi-core optical fibers of EXAMPLES 1 to 3 and a reference example;

FIG. 12 is a graph listing transmission losses, mode field diameters (MFD), cable cut-off wavelengths, bending losses, effective core areas, and incidence-end crosstalk of the multi-core optical fibers of EXAMPLES 1 to 3 and the reference example;

DETAILED DESCRIPTION OF THE INVENTION

A description will be made below in detail of embodiments of a multi-core optical fiber and a method of optical transmission according to the present invention, with reference to the accompanying drawings. The present invention is not limited by the embodiments. Further, in the present specification, a cable cut-off wavelength means a cable cut-off wavelength defined by ITU-T (International Telecommunication Union) G.650.1 In addition, terms that are not particularly defined in the present specification conform to definitions or measurement methods in ITU-T G.650.1.

Embodiment

Figure 1:
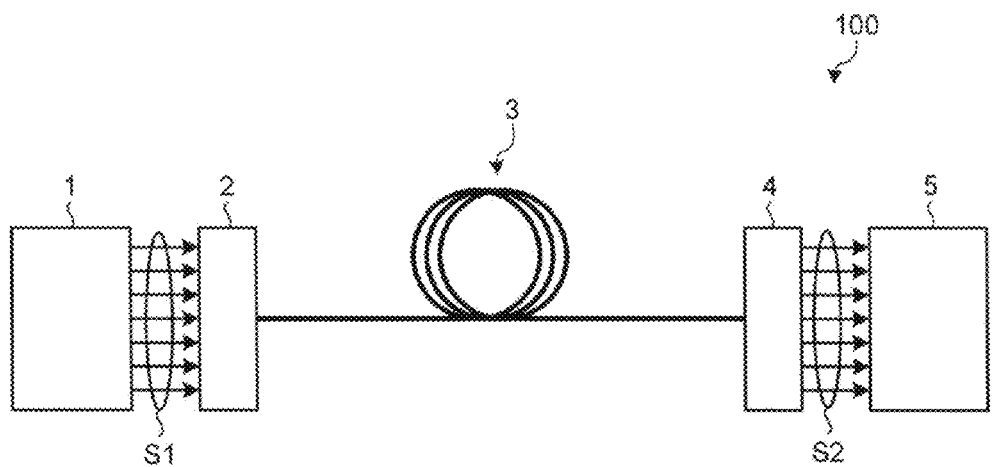
FIG. 1 is a schematic diagram of an optical transmission system using a multi-core optical fiber according to an embodiment.

FIG. 1 is a schematic diagram of an optical transmission system using a multi-core optical fiber according to an embodiment. As illustrated in FIG. 1, an optical transmission system 100 includes an optical transmitter 1, an optical connector 2, a multi-core optical fiber 3, an optical connector 4, and an optical receiver 5.

Figure 2:
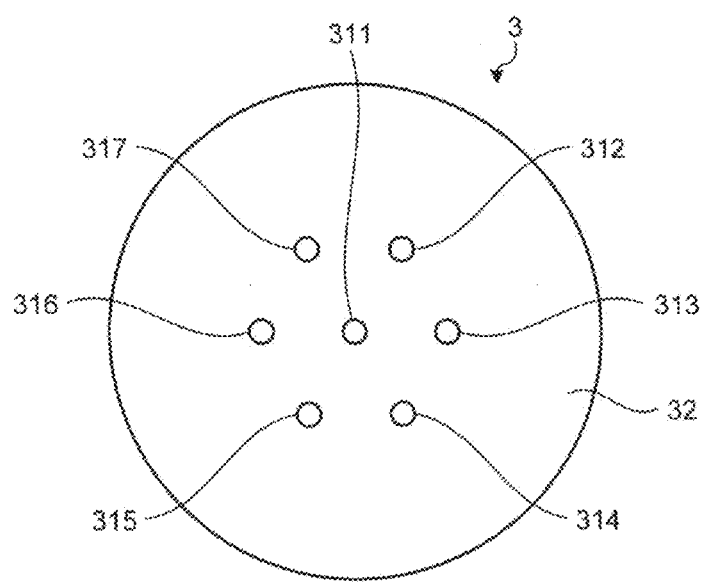
FIG. 2 is a schematic cross-sectional view of the multi-core optical fiber illustrated in FIG. 1.

FIG. 2 is a schematic cross-sectional view of the multi-core optical fiber illustrated in FIG. 1. As illustrated in FIG. 2, the multi-core optical fiber 3 includes seven core portions 311 to 317, and a cladding portion 32 positioned around each of the core portions 311 to 317.

The optical transmitter 1 includes seven signal light sources each of which is, for example, a semiconductor laser element, and outputs seven signal light beams S1. The optical connector 2 is configured to couple the seven signal light beams S1 into the seven core portions 311 to 317 of the multi-core optical fiber 3, respectively. The optical connector 2 may be constituted of a multi-core fiber connector formed by bundling optical fibers, as disclosed, for example, in Non Patent Literature 3 and 4.

Figure 3:
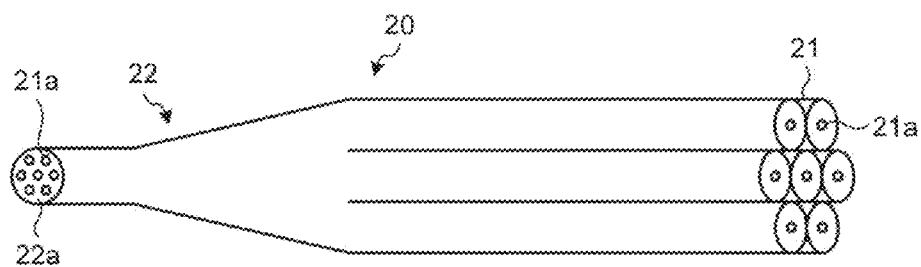
FIG. 3 is a schematic diagram illustrating one example of an optical fiber bundle.

FIG. 3 is a schematic diagram illustrating one example of an optical fiber bundle that is the multi-core fiber connector formed by bundling the optical fibers. As illustrated in FIG. 3, an optical fiber bundle 20 has seven single mode optical fibers 21 having core portions 21a and a bundle portion 22 formed by bundling and integrating these single mode optical fibers 21. On an end surface 22a of the bundle portion 22, the core portions 21a of the single mode optical fibers 21 are arranged in the same form as the core portions 311 to 317 so that the core portions 21a of the single mode optical fibers 21 are respectively coupled to the seven core portions 311 to 317 of the multi-core optical fiber 3.

Both the core portions 311 to 317 and the cladding portion 32 of the multi-core optical fiber 3 are composed of silica based glass. The core portion 311 is positioned in the vicinity of a central axis of the multi-core optical fiber 3, and the other core portions 312 to 317 are arranged to be positioned approximately at vertices of a regular hexagon having its center of gravity at the core portion 311. Further, the cladding portion 32 has a refractive index lower than that of each of the core portions 311 to 317. For example, the core portions 311 to 317 are composed of silica based glass, to which germanium (Ge) that is a dopant for increasing the refractive index has been added. The cladding portion 32 is composed of pure silica glass without a dopant for adjusting the refractive index. A refractive index profile of the core portions 311 to 317 is, for example, of a step index type, but may be of a W type, W-seg type, or trench type, not being particularly limited thereto. Further, a core diameter, a relative refractive-index difference, or the like of each of the core portions 311 to 317 may be set like a standard single mode optical fiber specified in ITU-T G.652, for example. In addition, a coating may be formed around the cladding portion 32.

Further, a cable cut-off wavelength of each of the core portions 311 to 317 is preferably set to 1530 nm or less. By setting the cable cut-off wavelength to 1530 nm or less, when a wavelength of input light is longer than 1530 nm, for example, 1550 nm, it is possible to realize mode division multiplexing transmission without multi-mode control, and to achieve a simple configuration.

The optical connector 4 is configured to be able to separately take out seven signal light beams S2 output from the core portions 311 to 317 after the signal light beams S1 are transmitted through the multi-core optical fiber 3. The optical connector 4 may also be constituted of the multi-core fiber connector like the optical connector 2.

The optical receiver 5 includes seven light receiving elements that receive the seven signal light beams S2 and convert the signal light beams S2 into electrical signals and a signal processing device that processes the electrical signals converted by the light receiving elements.

Here, the core portions 311 to 317 of the multi-core optical fiber 3, have a separation distance between the core portions adjacent to each other (hereinafter, referred to as a distance between cores) set so that light beams propagating therethrough interfere with each other. As a result, the seven signal light beams S1 input to the multi-core optical fiber 3 propagate in respective seven propagation modes of supermodes.

A supermode is a propagation mode that occurs by interaction of light beams propagating through different core portions when a distance between the core portions is very small in a multi-core optical fiber and is a particular mode that is not able to be defined by a general mode (see Non Patent Literature 5: I. Michaille, et al., "Phase locking and supermode selection in multicore photonic crystal fiber lasers with a large doped area," OPTICS LETTERS vol. 30, No. 13 (2005), pp. 1668-1670, for example). In a supermode in a multi-core optical fiber, a field of light basically spreads over a plurality of core portions around any one of the plurality of core portions. Therefore, by the signal light beams S1 being respectively input to the core portions 311 to 317 of the multi-core optical fiber 3, the respective supermodes are able to be selectively excited around the respective core portions. Further, the signal light beam in each mode propagates more stably in the multi-core optical fiber than for mode division multiplexing transmission through conventional multi-mode optical fibers.

In this optical transmission system 100, a method of optical transmission of performing mode division multiplexing transmission of the signal light beams S1 in the supermodes is carried out using the multi-core optical fiber 3. As the optical connector 2 for coupling the signal light beams S1 with the multi-core optical fiber 3, a conventional multi-core fiber connector configured to couple the seven signal light beams S1 to the seven core portions 311 to 317 of the multi-core optical fiber 3 respectively, may be used. As such a multi-core fiber connector, for example, a multi-core fiber connector formed by bundling optical fibers may be used. That is, it is unnecessary to use a spatial coupling system like the one used in a mode division multiplexing transmission system using a conventional multi-mode optical fiber, for coupling propagation modes in which a field distribution of light is asymmetrical with respect to a propagation axis of the optical fiber. Therefore, complicated structures and precise adjustments are not necessary for the optical connector 2, and thus reduction in optical loss is facilitated. Further, the multi-core fiber connector may also be used as the optical connector 4 for taking out the signal light beams S2. Accordingly, the need is eliminated for: an element that requires complicated structures and precise adjustments; and a spatial coupling system, in which reduction of optical loss is difficult, which have been required in coupling signal light beams to realize mode division multiplexing transmission using conventional multi-mode optical fibers.

Separation of the signal light beams S1 from the signal light beams S2 and data reproduction may be performed, in the signal processing device, by a MIMO technique using the transfer function matrix of the multi-core optical fiber 3.

Next, characteristics of the multi-core optical fiber 3 for realizing mode division multiplexing transmission using supermodes are explained. Crosstalk of light (hereinafter, simply referred to as crosstalk) among the core portions 311 to 317 is explained. When light is incident on a core portion (the center core portion 311, for example) from one end of a multi-core optical fiber, the crosstalk is obtainable from the following expression (1), where power of light emitted from the core portion 311 at the other end thereof is P0 [mW], and power of light emitted from the other core portion (the outer core portion 312, for example) is P1 [mW]. For a sufficiently long multi-core optical fiber, which has a length of approximately 100 meters or longer, a theoretical maximum value of crosstalk is 0 dB.

$$10 \times \log(P1/P0) \text{ [dB]} \quad (1)$$

Although a supermode occurs even if crosstalk is small (that is, a distance between cores is large), the number of core portions with respect to a cross-sectional area of the multi-core optical fiber 3 becomes small. Accordingly, the space utilization efficiency is lowered, and the effect of applying the mode division multiplexing transmission technique becomes small. Therefore, crosstalk over the entire length of the multi-core optical fiber 3 is preferably −15 dB or greater so that the space utilization efficiency becomes higher. In the multi-core optical fiber, when space division multiplexing transmission is performed without using supermodes, it is necessary to suppress the interference of signal light beams among the core portions and hence, the crosstalk is preferably −30 dB or less. To achieve this, it is necessary to increase the distance between cores, and thus the space utilization efficiency becomes lower.

The larger the crosstalk is, the larger the interference between the signal light beams becomes. Therefore, in each of the signal light beams S2 output from the core portions 311 to 317, a degree of mixing of plural signal light beams becomes large. In order to separate each of the signal light beams S1 from each of the signal light beams S2 in a state where the plural signal light beams are mixed by the MIMO technique, the crosstalk over the entire length of the multi-core optical fiber 3 is preferably less than 0 dB.

Figure 4:
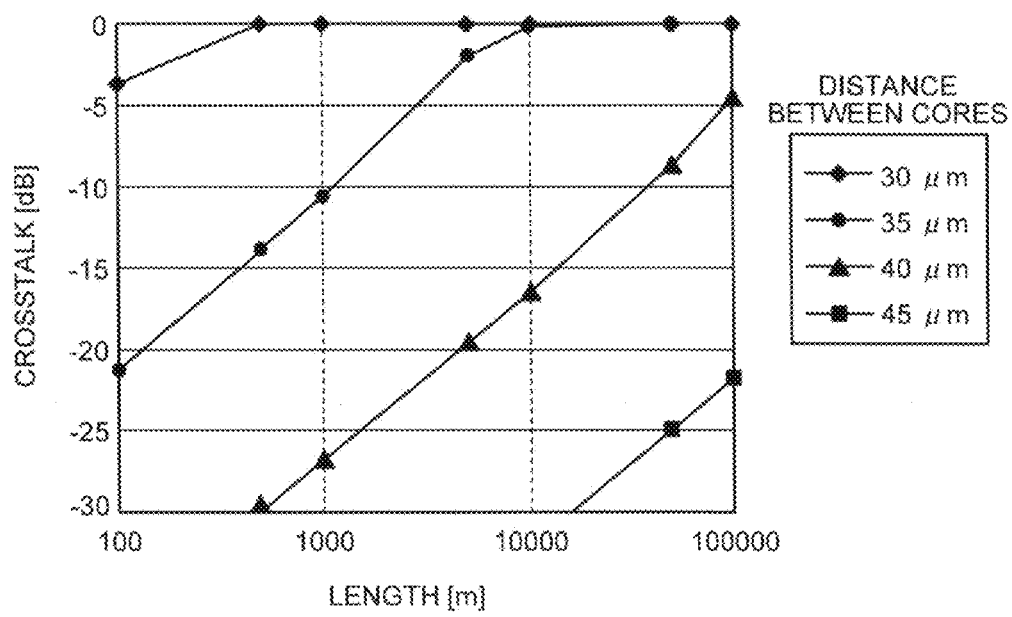
FIG. 4 is a graph illustrating a relation between length of the multi-core optical fiber and crosstalk when distance between cores is changed.

Next, setting of the distance between cores for realizing the above-mentioned preferable crosstalk is explained. FIG. 4 is a graph illustrating relations between length of the multi-core optical fiber and crosstalk when the distance between cores is changed. The crosstalk indicates a value at a wavelength of 1550 nm. The structure of the multi-core optical fiber is illustrated in FIG. 2. A refractive index profile of the core portion is of a step index type, a diameter of the core portion (core diameter) is set to 8.6 and a relative refractive-index difference $\Delta$ of the core portion relative to the cladding portion is set to 0.34%. Further, the core portions are set to have their distances between cores equal to each other.

As illustrated in FIG. 4, crosstalk becomes larger along with increase in length of the multi-core optical fiber. Further, the crosstalk becomes smaller along with increase in the distance between cores. A transmission distance assumed in the optical transmission system is generally in the range from 100 meters to 100 km. Therefore, the refractive index profile of the core portion and the distance between cores are preferably set so that, over the length of the multi-core optical fiber corresponding to the assumed transmission distance, the crosstalk becomes −15 dB or greater, and more preferably less than 0 dB.

Next, relations among the core diameter, the relative refractive-index difference $\Delta$ of the core portion relative to the cladding portion, and the crosstalk in the multi-core optical fiber of a structure having seven core portions as illustrated in FIG. 2 were found by a simulation. FIG. 5 is a table listing results of the simulation. In each of calculation samples No. 1 to No. 22, the core diameters of the respective core portions and their relative refractive-index differences $\Delta$ are the same. For example, in the calculation sample No. 1, each of the seven core portions has a core diameter of 5 μm and a relative refractive-index difference $\Delta$ of 0.45%. Symbols "neff" and "Aeff" denote an effective refractive index at a wavelength of 1550 nm and an effective core area, respectively. A symbol "λcc" denotes the cable cut-off wavelength. Further, the distance between cores is set to 25 μm, 30 μm, or 35 μm. In addition, the crosstalk indicates a value at a wavelength of 1550 nm where the length of the multi-core optical fiber (corresponding to the transmission distance) is in the range from 100 meters to 100 km. The crosstalk indicates a value at a bending diameter of 280 mm. As illustrated in FIG. 5, in all the calculation samples, the cable cut-off wavelength satisfies a value of 1530 nm or less.

FIG. 6 is a table listing results obtained by simulation for the distance between cores at which the crosstalk becomes 0 dB or −15 dB at the core diameter and the relative refractive-index difference $\Delta$ of each calculation sample. The crosstalk indicates a value at a wavelength of 1550 nm. In the range between the distances between cores illustrated in FIG. 6, it is possible to achieve the preferable crosstalk of −15 dB or greater and less than 0 dB. For example, when the length is 100 meters in the calculation sample No. 1, the distance between cores is preferably 39.1 μm or less and greater than 32.7 μm. In particular, the distance between cores is preferably equal to or less than 35 μm to increase the space utilization efficiency.

Next, FIGS. 7 and 8 are tables listing results of simulation for a relation between the core diameter and the relative refractive-index difference Δ for which the crosstalk becomes 0 dB or −15 dB at a distance between cores of 25 μm, 30 μm, or 35 μm. The crosstalk indicates a value at a wavelength of 1550 nm. In FIGS. 7 and 8, hatched samples have a cable cut-off wavelength greater than 1530 nm, and the other samples satisfy a cable cut-off wavelength of 1530 nm or less. In FIGS. 7 and 8, in the range between the relative refractive-index differences for which the crosstalk becomes 0 dB and −15 dB, the crosstalk becomes −15 dB or greater and less than 0 dB. For example, when the core diameter is 5 μm and the length is 10 km, the relative refractive-index difference Δ is preferably equal to or less than 0.88% and greater than 0.79%.

From these results, in the range of the transmission distance from 100 meters to 100 km, to satisfy a crosstalk of −15 dB or greater and less than 0 dB and a cable cut-off wavelength of 1530 nm or less, a core diameter is in a range of 5 μm or greater and less than 13 μm, a relative refractive-index difference is in a range of greater than 0.16% and equal to or less than 0.93%, and a distance between cores is in a range of 25 μm or greater and 35 μm or less. However, when the transmission distance is, for example, as long as 100 km, it is possible to achieve the crosstalk of −15 dB or greater at a distance between cores of 56 μm or less (55.1 μm, for example).

In order to achieve Aeff of a sufficient value, for example, of 40 μm$^2$ or greater to prevent an increase in bending loss (neff is 1.4450 or greater and a value corresponding to approximately less than 100 dB/m when converted to bending loss upon bending at a diameter of 20 mm), the core diameter is preferably set to 5 μm or greater.

Further, the core diameter is more preferably less than 13 μm in order to set the crosstalk in the range of −15 dB or greater to less than 0 dB at a cable cut-off wavelength of 1530 nm or less.

In the multi-core optical fiber, by setting the crosstalk of light between the core portions to −15 dB or greater and equal to or less than a predetermined value, the supermode, in which light input to a predetermined core portion is localized and propagated in that input core portion, is excited. Such a multi-core optical fiber has characteristics intermediate between: a strong coupling type multi-core optical fiber, in which the crosstalk of light between the core portions is large and the light propagated in each core portion is strongly coupled; and a non-coupling type multi-core optical fiber, in which the crosstalk of light between the core portions is, for example, −30 dB or less, and thus is hereinafter referred to as a weak coupling type multi-core optical fiber. By such a weak coupling type multi-core optical fiber, a multi-core optical fiber is able to be realized, which receives the benefits of improvement in spatial multiplicity and has a high identifiability in identifying each optical signal without adjusting a phase between optical signals input to the respective core portions.

Figure 9:
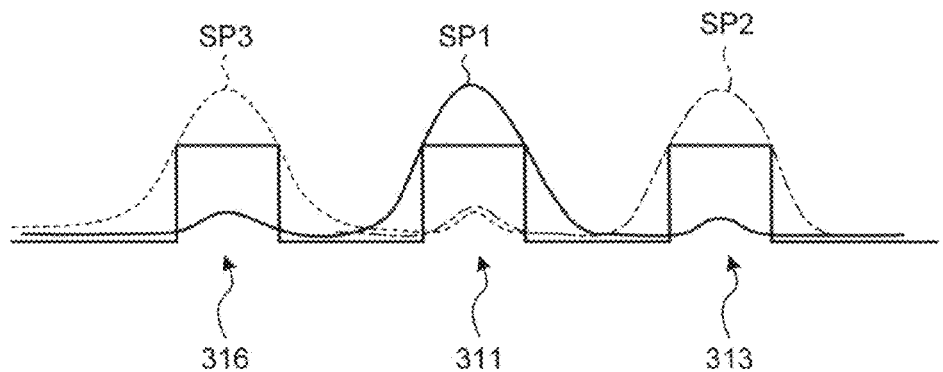
FIG. 9 is a diagram illustrating one example of field distribution of light in a weak coupling type multi-core optical fiber.

FIG. 9 is a view illustrating one example of a field distribution of light in the weak coupling type multi-core optical fiber. FIG. 9 illustrates the core portions 311, 313, and 316 arranged linearly in the multi-core optical fiber 3 illustrated in FIG. 2 as one example of the weak coupling type multi-core optical fiber. As illustrated in FIG. 9, a field SP1 of a light beam input to the core portion 311 is localized in that core portion 311, slightly distributed in the other core portions 313 and 316 also, and propagates in a supermode. Similarly, fields SP2 and SP3 of respective light beams input to the core portions 313 and 316 are also localized in the core portions 313 and 316 respectively, slightly distributed in the other core portions, and propagate in supermodes. Accordingly, if the field of each light beam propagates in the supermode so as to be localized in that core portion to which it has been input, identifiability in identifying each optical signal becomes high without adjustment of a phase between optical signals input to respective core portions.

This state of a field of a light beam being localized in a core portion to which the light field has been input is not limited to a case where the field of the light beam exists only in that core portion. In the present specification, if a light beam is input to a specific core portion, when a reciprocal (Np1/p0) of a ratio of, at an incidence end, an intensity (p0) of light of the input light beam, the light being localized in that specific core portion and coupled to a specific supermode, to a sum (Np1 when the number of the other core portions is N) of intensities of light of light beams, the light being coupled to that specific supermode, the light beams having been input to the other core portions positioned around the specific core portion, is equal to or less than a predetermined value, the field of the light beam is defined as being localized in the core portion to which the light beam has been input. This reciprocal may be expressed in decibels as in the following expression (2). Hereinafter, the expression (2) is referred to as incidence-end crosstalk.

$$10 \times \log(Np1/p0) \; [dB] \quad (2)$$

In the multi-core optical fiber 3 illustrated in FIG. 2, the core portion 311 positioned in the vicinity of the central axis has six core portions 312 to 317 around the core portion 311. Accordingly, considering a case where equal-intensity light beams input to the respective core portions 312 to 317 are coupled to the specific supermode localized in the core portion 311, N is six at most. Similarly, N is three at most for the other core portions 312 to 317. Hereinafter, assuming N to be six, characteristics of incidence-end crosstalk will be explained with respect to the core portion 311. If incidence-end crosstalk for the maximum N is of an appropriate value, it is evident that incidence-end crosstalk for N equal to or less than that would be of a value less than this appropriate value and thus would also be appropriate.

Figure 10:
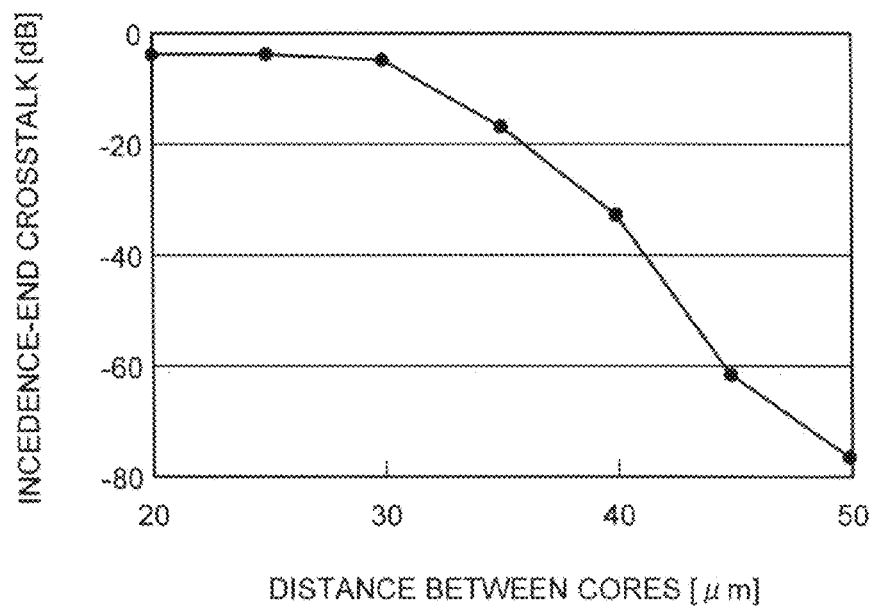
FIG. 10 is a graph illustrating one example of a relation between distance between cores and incidence-end crosstalk for a core portion positioned in the vicinity of a central axis of the multi-core optical fiber illustrated in FIG. 2.

FIG. 10 is a graph illustrating one example of a relation between distance between cores and incidence-end crosstalk for a core portion 311 positioned in the vicinity of the central axis of the multi-core optical fiber 3 illustrated in FIG. 2. Calculations were performed assuming that each of the core portions 311 to 317 had a core diameter of 8.6 μm and a relative refractive-index difference Δ of 0.35%. In the example illustrated in FIG. 10, when the distance between cores is in the range from 20 to 25 μm, the incidence-end crosstalk is approximately constant at −4.3 dB. However, when the distance between cores becomes 30 μm, the incidence-end crosstalk is decreased to −4.9 dB and a specific supermode starts to be localized in the core portion 311. When the distance between cores is equal to or greater than 30 μm, it is considered that an extent of localization is intensified along with the increase in the distance between cores whereby the incidence-end crosstalk is decreased. As described, when the incidence-end crosstalk is decreased from a constant value by about −0.6 dB along with the increase in the distance between cores, it is considered that a specific supermode starts to be localized in a core portion and identifiability of an optical signal is enhanced.

Examples 1 to 3

As EXAMPLES 1 to 3 of the present invention and a reference example, multi-core optical fibers each configured to have seven core portions as illustrated in FIG. 2 and having a core diameter of 8.6 µm and a relative refractive-index difference Δ of the core portion relative to a cladding portion of 0.34% were manufactured. A coating was formed around the cladding portion of each multi-core optical fiber.

FIG. 11 is a table listing a distance between cores, a cladding outer diameter, and a coating outer diameter of each of the multi-core optical fibers of EXAMPLES 1 to 3 and the reference example. Each of the multi-core optical fibers has the cladding outer diameter of equal to or less than 200 µm, and the coating outer diameter of equal to or less than 350 µm. As illustrated in FIG. 8, in EXAMPLES 1 to 3, the distances between cores are 25 µm, 30 µm, and 35 µm, respectively. In the reference example, the distance between cores is 20 µm.

FIG. 12 is a table listing a transmission loss with respect to a center core portion, a mode field diameter (MFD), a cable cut-off wavelength, a bending loss, an effective core area (Aeff), and incidence-end crosstalk for each of the multi-core optical fibers of EXAMPLES 1 to 3 and the reference example. Here, in FIG. 12, each of the transmission loss, the MDF, the bending loss, the Aeff, and the incidence-end crosstalk is of a value at a wavelength of 1550 nm. These values of incidence-end crosstalk were re-simulation-calculated from structural parameters (the core diameter, the relative refractive index, and the distance between cores) of each of the manufactured multi-core optical fibers of EXAMPLES 1 to 3 and the reference example. Every value listed for EXAMPLES 1 to 3 in FIG. 12 was of a favorable value estimated from designing of that multi-core optical fiber. The characteristics listed in FIG. 12 with respect to the other core portions were similar to those of the center core portion in each EXAMPLE. Further, the incidence-end crosstalk was, similarly to the results of FIG. 10, constant for 20 µm or 25 µm, and decreased from the constant value for 30 µm or greater. The MFD, the Aeff, and the cable cut-off wavelength of the multi-core optical fiber of the reference example were not measurable since the distance between cores was small and the interaction of light beams was large.

Figure 13:
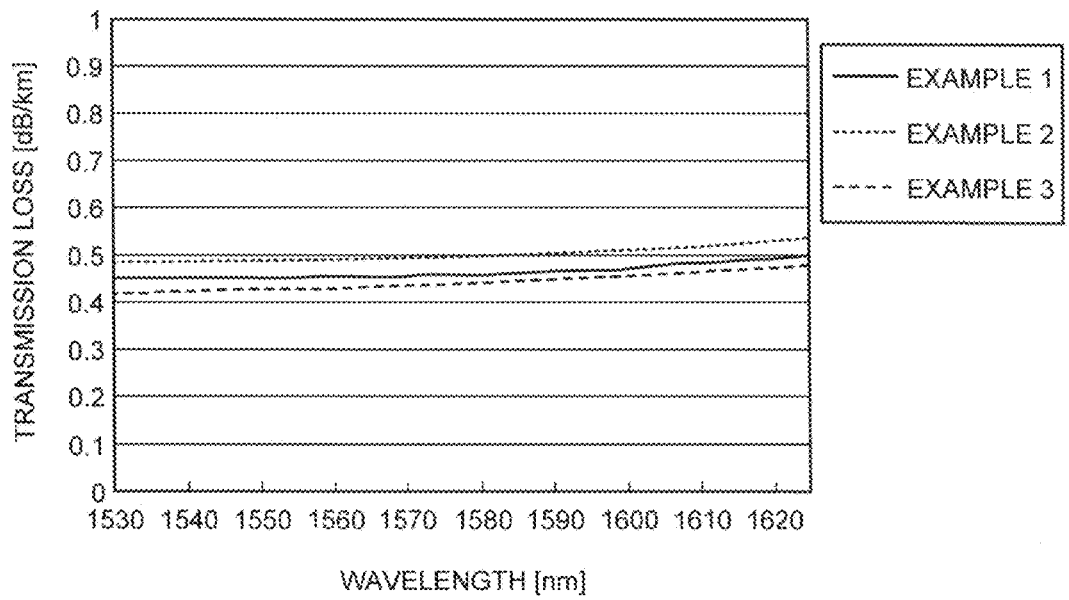
FIG. 13 is a graph illustrating transmission loss spectra of the multi-core optical fibers of EXAMPLES 1 to 3.

FIG. 13 is a graph illustrating transmission loss spectra with respect to the center core portions in the multi-core optical fibers of EXAMPLES 1 to 3. As illustrated in FIG. 13, the transmission loss spectrum in each of the multi-core optical fibers of EXAMPLES 1 to 3 was 0.6 dB/km or less in a wavelength range of 1530 nm to 1625 nm, which is most frequently used in optical fiber communications, and demonstrated flat characteristics having small wavelength-dependence.

Next, the multi-core optical fibers of EXAMPLES 1 to 3 of various lengths were wrapped around bobbins having different diameters to measure crosstalk of each multi-core optical fiber. This crosstalk was obtained from the above-mentioned expression (1), where, when a light beam was input to the center core portion from one end of each multi-core optical fiber, P0 [mW] was a power of the light beam emitted from the center core portion at the other end, and P1 [mW] was an average value of powers of light beams emitted from the other outer six core portions.

Figure 14:
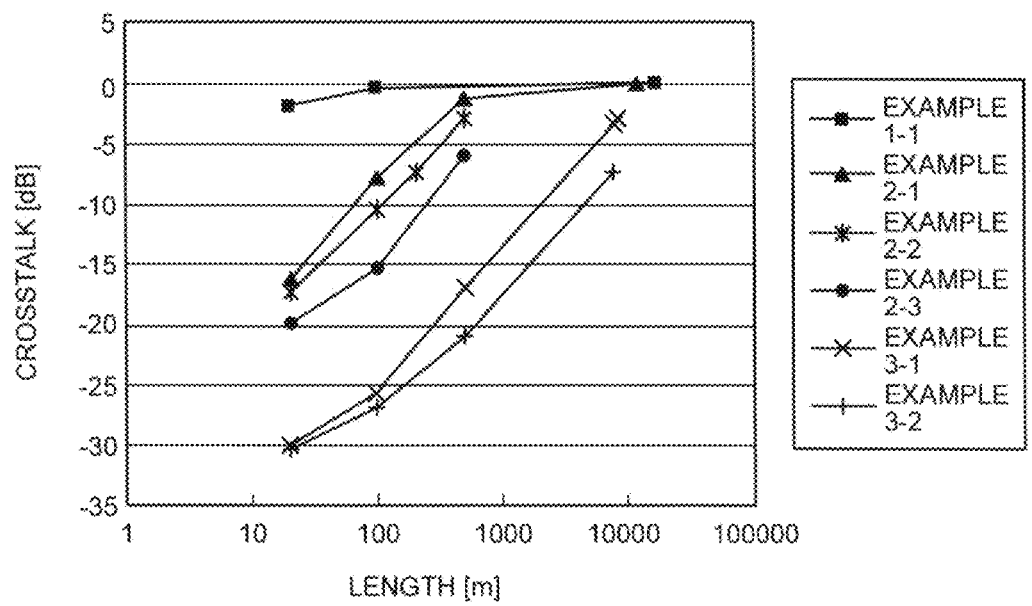
FIG. 14 is a graph illustrating a relation between length and crosstalk in each of the multi-core optical fibers of EXAMPLES 1-1, 2-1 to 2-3, and 3-1 to 3-2.

FIG. 14 is a graph illustrating a relation between the length and the crosstalk of each of the multi-core optical fibers of EXAMPLES 1-1, 2-1 to 2-3, and 3-1 to 3-2. This crosstalk is of a value at the wavelength of 1550 nm. EXAMPLE 1-1 is the multi-core optical fiber of EXAMPLE 1 wrapped around a bobbin of a diameter of 280 mm. EXAMPLES 2-1 to 2-3 are the multi-core optical fibers of EXAMPLE 2 wrapped around bobbins having diameters of 280 mm, 160 mm, and 60 mm, respectively. EXAMPLES 3-1 and 3-2 are the multi-core optical fibers of EXAMPLE 3 wrapped around bobbins having diameters of 280 mm and 160 mm, respectively. By being wrapped around the bobbin of the above-mentioned diameter, each multi-core optical fiber is in a state where a wrapping diameter (bending diameter) thereof is the diameter of that bobbin. For example, when a multi-core optical fiber is wrapped around a bobbin of a diameter of 280 mm, a bending diameter of that multi-core optical fiber is 280 mm.

As illustrated in FIG. 14, in the multi-core optical fiber of each EXAMPLE having the distances between cores in the range from 25 µm to 35 µm, it was confirmed that by setting the length thereof as appropriate, preferable crosstalk of −15 dB or greater and crosstalk of less than 0 dB were obtained. Further, in EXAMPLES 1-1 and 2-1 to 2-3 having the distances between cores in the range from 25 µm to 30 µm, it was confirmed that the range of length of the multi-core optical fiber for which a crosstalk of −15 dB or greater was able to be obtained was wider and thus more preferable. Further, shapes of the curbs illustrating the relations between the length and the crosstalk did not change largely even when the bending diameters of the multi-core optical fibers were changed.

Next, near-field patterns when light beams were incident on the center core portions of the multi-core optical fibers of EXAMPLES 1 to 3 and the reference example were measured. In order to determine an excitation state at an incidence end, a length of each multi-core optical fiber was set to two meters for the measurement. As a result, it was confirmed that the multi-core optical fibers of the reference example and EXAMPLE 1 each had a field distribution extending over a plurality of core portions already from its incidence end, and thus was undesirable for selective excitation of supermode.

Figure 15:
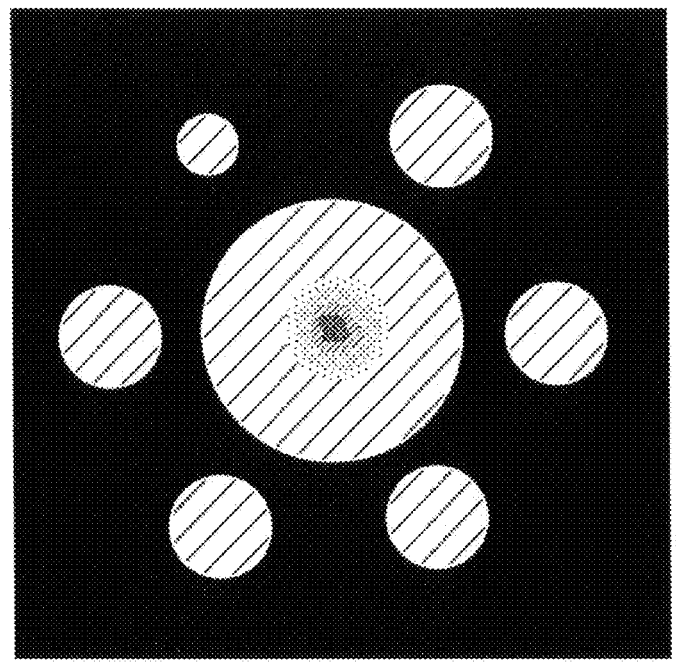
FIG. 15 is a diagram illustrating a field pattern of the multi-core optical fiber of EXAMPLE 2.
Figure 16:
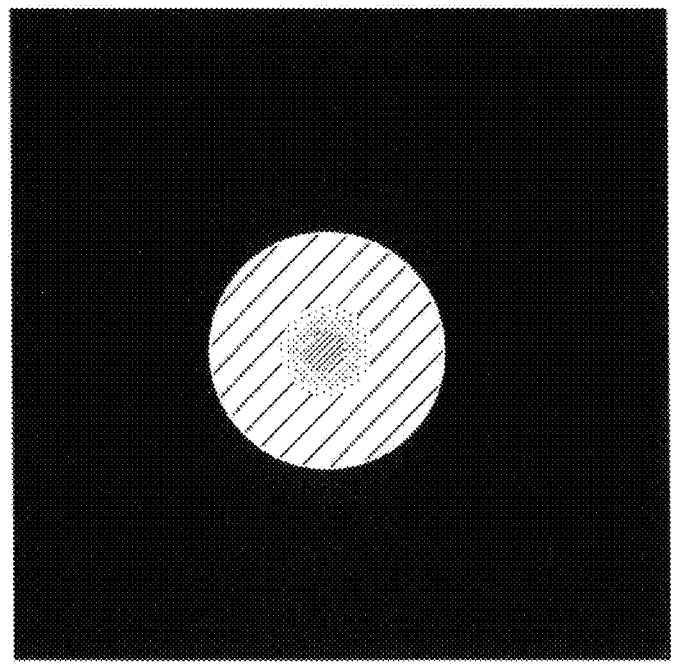
FIG. 16 is a diagram illustrating a field pattern of the multi-core optical fiber of EXAMPLE 3.

FIGS. 15 and 16 are diagrams illustrating field patterns in the multi-core optical fibers of EXAMPLES 2 and 3, respectively. As illustrated in FIG. 15, although the multi-core optical fiber of EXAMPLE 2 had a field distribution extending over a plurality of core portions, localization of the field in the center core portion was enhanced, and selective excitation of supermode was confirmed to be possible. Further, as illustrated in FIG. 16, in the multi-core optical fiber of EXAMPLE 3, the localization of the field in the center core portion was more enhanced, and greater suitability for the selective excitation of supermode was confirmed.

With respect to the multi-core optical fibers of EXAMPLES 1 to 3 and the reference example, the field distributions of light when the light was incident on the outer core portions were determined. As a result, similarly to the case where light was caused to be incident on the center core portion, with respect to the outer core portions also: the selective excitation of supermode was confirmed to be possible in the multi-core optical fiber of EXAMPLE 2; and the multi-core optical fiber of EXAMPLE 3 was confirmed to be more suitable for the selective excitation of supermode.

Although in the above embodiment, the number of the core portions is seven, the present invention is not limited thereto, and is applicable to a multi-core optical fiber having three or more core portions, for example. Further, although in the above embodiment, the crosstalk is of values at the wavelength of 1550 nm, the present invention is not limited thereto and is applicable to a multi-core optical fiber having a crosstalk of −15 dB or greater at a wavelength of light that is input (1530 nm to 1625 nm, which is the wavelength range used in optical fiber communications, for example).

According to an embodiment of the present invention, because mode division multiplexing transmission is possible using supermodes, a multi-core optical fiber and a method of optical transmission for the mode division multiplexing transmission are able to be realized, which do not require complex structures and precise adjustments and are able to reduce optical loss when a plurality of signal light beams are input simultaneously.

The present invention is not limited by the above-mentioned embodiment. The present invention also includes configurations obtained by combining any of the above-mentioned components as appropriate. In addition, additional effects and modifications can easily be derived by those skilled in the art. Therefore, wider aspects of the present invention are not limited to the above-mentioned embodiment, and various modifications are possible.

What is claimed is:

1. A method of optical transmission, comprising:
   performing mode division multiplexing transmission using a supermode of a multi-core optical fiber, the multi-core optical fiber comprising:
   a plurality of core portions; and
   a cladding portion that is positioned around each of the plurality of core portions and has a refractive index lower than that of each of the plurality of core portions, wherein
   the multi-core optical fiber is configured so that
   a separation distance between adjacent ones of the plurality of core portions is 25 µm to 56 µm,
   crosstalk of light between the adjacent core portions over an entire length in use in performing the mode division multiplexing transmission using a supermode of the multi-core optical fiber selected from equal to or greater than 100 m to equal to or less than 100 km becomes −15 dB or greater and less than 0 dB at a wavelength of 1550 nm,
   a core diameter of each of the plurality of core portions is equal to or greater than 5 µm and less than 13 µm,
   a relative refractive-index difference of each of the plurality of core portions relative to the cladding portion is greater than 0.16% and equal to or less than 0.93%,
   a cable cut-off wavelength becomes 1530 nm or less, and,
   the mode division multiplexing transmission is performed by using the supermode so that a field of light input to any one of the plurality of core portions of the multi-core optical fiber propagates while being localized in that core portion.

2. The method of optical transmission according to claim 1, wherein the separation distance is 25 µm to 35 µm.

3. The method of optical transmission according claim 2, wherein the separation distance is equal to or less than 30 µm.

4. The method of optical transmission according to claim 1, wherein the separation distance is 30 µm to 56 µm.

* * * * *